US007925643B2

(12) United States Patent
Balegar et al.

(10) Patent No.: US 7,925,643 B2
(45) Date of Patent: Apr. 12, 2011

(54) ENCODING AND DECODING OF XML DOCUMENT USING STATISTICAL TREE REPRESENTING XSD DEFINING XML DOCUMENT

(75) Inventors: Umesh Kumar B. Balegar, Bangalore (IN); Rohit Shetty, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 12/037,417

(22) Filed: Jun. 8, 2008

(65) Prior Publication Data
US 2009/0307244 A1    Dec. 10, 2009

(51) Int. Cl.
*G06F 7/00* (2006.01)
(52) U.S. Cl. ......... 707/713; 707/745; 707/797; 715/234
(58) Field of Classification Search ................... 707/713, 707/745, 797; 715/234
See application file for complete search history.

(56) References Cited

U.S. PATENT DOCUMENTS

| 6,883,137 | B1 | | 4/2005 | Girardot et al. | |
|---|---|---|---|---|---|
| 6,966,027 | B1 | * | 11/2005 | Krasinski | 715/234 |
| 7,231,386 | B2 | * | 6/2007 | Nonomura et al. | 1/1 |
| 7,251,697 | B2 | * | 7/2007 | Piotrowski | 709/231 |
| 7,530,015 | B2 | * | 5/2009 | Sampathkumar et al. | 715/237 |
| 7,587,667 | B2 | * | 9/2009 | Scardina et al. | 715/230 |
| 2002/0138517 | A1 | | 9/2002 | Mory et al. | |
| 2003/0005001 | A1 | * | 1/2003 | Kataoka | 707/513 |
| 2003/0167444 | A1 | * | 9/2003 | Zorc | 715/513 |
| 2004/0004619 | A1 | * | 1/2004 | Capin et al. | 345/473 |
| 2004/0013307 | A1 | | 1/2004 | Thienot et al. | |
| 2004/0068694 | A1 | * | 4/2004 | Kaler et al. | 715/513 |
| 2004/0107402 | A1 | * | 6/2004 | Seyrat et al. | 715/513 |
| 2004/0139393 | A1 | * | 7/2004 | Heuer et al. | 715/513 |
| 2005/0097455 | A1 | * | 5/2005 | Zhou et al. | 715/513 |
| 2005/0114763 | A1 | * | 5/2005 | Nonomura et al. | 715/513 |
| 2005/0120031 | A1 | * | 6/2005 | Ishii | 707/100 |
| 2005/0182778 | A1 | * | 8/2005 | Heuer et al. | 707/101 |
| 2005/0278616 | A1 | * | 12/2005 | Eller | 715/513 |
| 2005/0289457 | A1 | * | 12/2005 | Obasanjo et al. | 715/513 |
| 2006/0004858 | A1 | * | 1/2006 | Tran et al. | 707/104.1 |
| 2007/0074037 | A1 | * | 3/2007 | Eckleder | 713/180 |
| 2007/0250766 | A1 | * | 10/2007 | Medi et al. | 715/513 |
| 2007/0271305 | A1 | * | 11/2007 | Chandrasekar et al. | 707/200 |
| 2008/0077856 | A1 | * | 3/2008 | Gazzillo | 715/239 |
| 2008/0148141 | A1 | * | 6/2008 | Heuer et al. | 715/234 |
| 2009/0144251 | A1 | * | 6/2009 | Dettinger et al. | 707/3 |

(Continued)

OTHER PUBLICATIONS

M. Girardot et al., "Miliau: an encoding format for efficient representation and exchange of XML over the Web, "Computer Networks vol. 33, pp. 747-765 (year 2000).

(Continued)

*Primary Examiner* — Cheyne D Ly
(74) *Attorney, Agent, or Firm* — Jeff LaBaw

(57) ABSTRACT

A statistical tree representing an eXtensible Markup Language (XML) Schema document (XSD) is generated. The statistical tree captures information defined by the XSD by representing elements, attributes, and enumerations of the XSD as branches, nodes, and leaves of the statistical tree. The statistical tree has bits corresponding to nodes of the statistical tree. An XML document defined by the XSD is adaptively encoded, or compressed, as a number of bits based on the statistical tree that has been generated. The number of bits encoding the XML document are decoded, or decompressed, to yield the XML document also based on the statistical tree that has been generated.

12 Claims, 9 Drawing Sheets

U.S. PATENT DOCUMENTS

2010/0057888 A1* 3/2010 Owen et al. .................. 709/219

OTHER PUBLICATIONS

U. Niedermeir et al., "An MPEG-7 tool for compression and streamining of XML data," in Procs. of IEEE Int'l Conf. on Multimedia and Expo. vol. 1, pp. 521-524, Aug. 2002.

K. Swanson et. al., "CompreX: further developments in XML compression, "IEEEAC paper #10, 1101, version 2.0, updated Dec. 8, 2005.

R. De Sutter et al., "Multimedia metadata processing: A format independent approach, "Procs. of 9th IASTED Int'l Conf., Feb. 21-23, 2005.

"XML and Compression, "Internet web site http://xml.coverpages.org/xmlAndCompression.html, created 2004, last updated Sep. 27, 2007.

List of general text compression references, Internet web site http://www.dmoz.org/Computers/Algorithrns/Cornpression/, last updated Jan. 18, 2008.

"Cornpresion Agorithms, "Internet web site http://www.softpanorama.org/Algorithms/compression.shtml. last modified Jan. 31, 2008.

W.Y. Lam, "XCQ: XML Compression and Querying System," In Procs. of 12th Int'l WWW Conf., Poster Presentation 59, year 2003.

"XML Schema,"Internet web site http://www.w3.org/XML/Schema.html, created Apr. 2000, last updated Jan. 6, 2008.

"XML Path Language (XPath)," W3C Recommendation Nov. 16, 1999, Internet web site http://www.w3.org/TR/xpath.

US 6,925,596, 08/2005, Maruyama et al. (withdrawn)

* cited by examiner

```xml
<?xml version="1.0" encoding="UTF-8"?>
<xsd:schema xmlns:xsd="http://www.w3.org/2001/XMLSchema" xmlns:cbe="http://www.ibm.com/CBE1_0_1"
targetNamespace="http://www.ibm.com/CBE1_0_1" version="1.0.1" elementFormDefault="qualified">
    <xsd:complexType name="CBEType">
        <xsd:sequence>
            <xsd:element name="EDE" type="cbe:EDEType" minOccurs="0" maxOccurs="unbounded" />
            <xsd:element name="srcComp" type="cbe:CompIdType" minOccurs="1" maxOccurs="1" />
        </xsd:sequence>
        <xsd:attribute name="version"  type = "xsd:string " use="optional" />
        <xsd:attribute name="msg" use="required">
            <xsd:simpleType>
                <xsd:restriction base="xsd:string">
                    <xsd:maxLength value="16"></xsd:maxLength>
                </xsd:restriction>
            </xsd:simpleType>
        </xsd:attribute>
    </xsd:complexType>
    <xsd:element name="CBE" type="cbe:CBEType" />
    <xsd:complexType name="CompIdType">
        <xsd:attribute name="component" use="required">
            <xsd:simpleType>
                <xsd:restriction base="xsd:string">
                    <xsd:maxLength value="256" />
                </xsd:restriction>
            </xsd:simpleType>
        </xsd:attribute>
    </xsd:complexType>
    <xsd:complexType name="EDEType">
        <xsd:sequence>
            <xsd:choice minOccurs="0" maxOccurs="1">
                <xsd:element name="values" minOccurs="1" maxOccurs="unbounded">
                    <xsd:simpleType>
                        <xsd:restriction base="xsd:string">
                            <xsd:maxLength value="1024"></xsd:maxLength>
                        </xsd:restriction>
                    </xsd:simpleType>
                </xsd:element>
                <xsd:element name="hexValue" type="xsd:hexBinary" minOccurs="1" maxOccurs="1" />
            </xsd:choice>
        </xsd:sequence>
        <xsd:attribute name="name" use="required">
            <xsd:simpleType>
                <xsd:restriction base="xsd:string">
                    <xsd:maxLength value="64"></xsd:maxLength>
                </xsd:restriction>
            </xsd:simpleType>
        </xsd:attribute>
        <xsd:attribute name="type" use="required">
            <xsd:simpleType>
                <xsd:restriction base="xsd:string">
                    <xsd:maxLength value="64"></ xsd:maxLength>
                        <xsd:enumeration value="noValue"></xsd:enumeration>
                        <xsd:enumeration value="byte"></xsd:enumeration>
                        <xsd:enumeration value="short"></xsd:enumeration>
                        <xsd:enumeration value="int"></xsd:enumeration>
                    <xsd:minLength value="1"></xsd:minLength>
                </xsd:restriction>
            </xsd:simpleType>
        </xsd:attribute>
    </xsd:complexType>
</xsd:schema>
```

FIG 1

```
<CBE msg="sample">
    <EDE name="demo1" type="int">
        <values>100</values>
        <values>101</values>
    </EDE>
    <srcComp component="compressor"/>
</CBE>
```
FIG 2
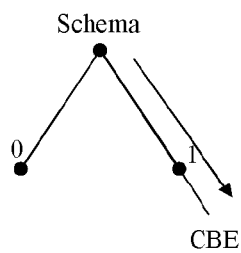
FIG 3A
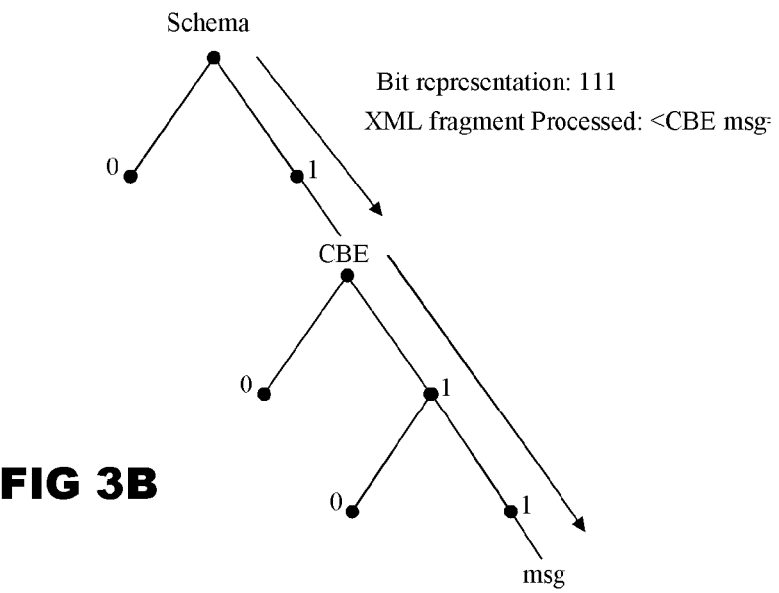
Bit representation: 111
XML fragment Processed: <CBE msg=
FIG 3B

Bit representation: 11111
XML fragment Processed: <CBE msg="""

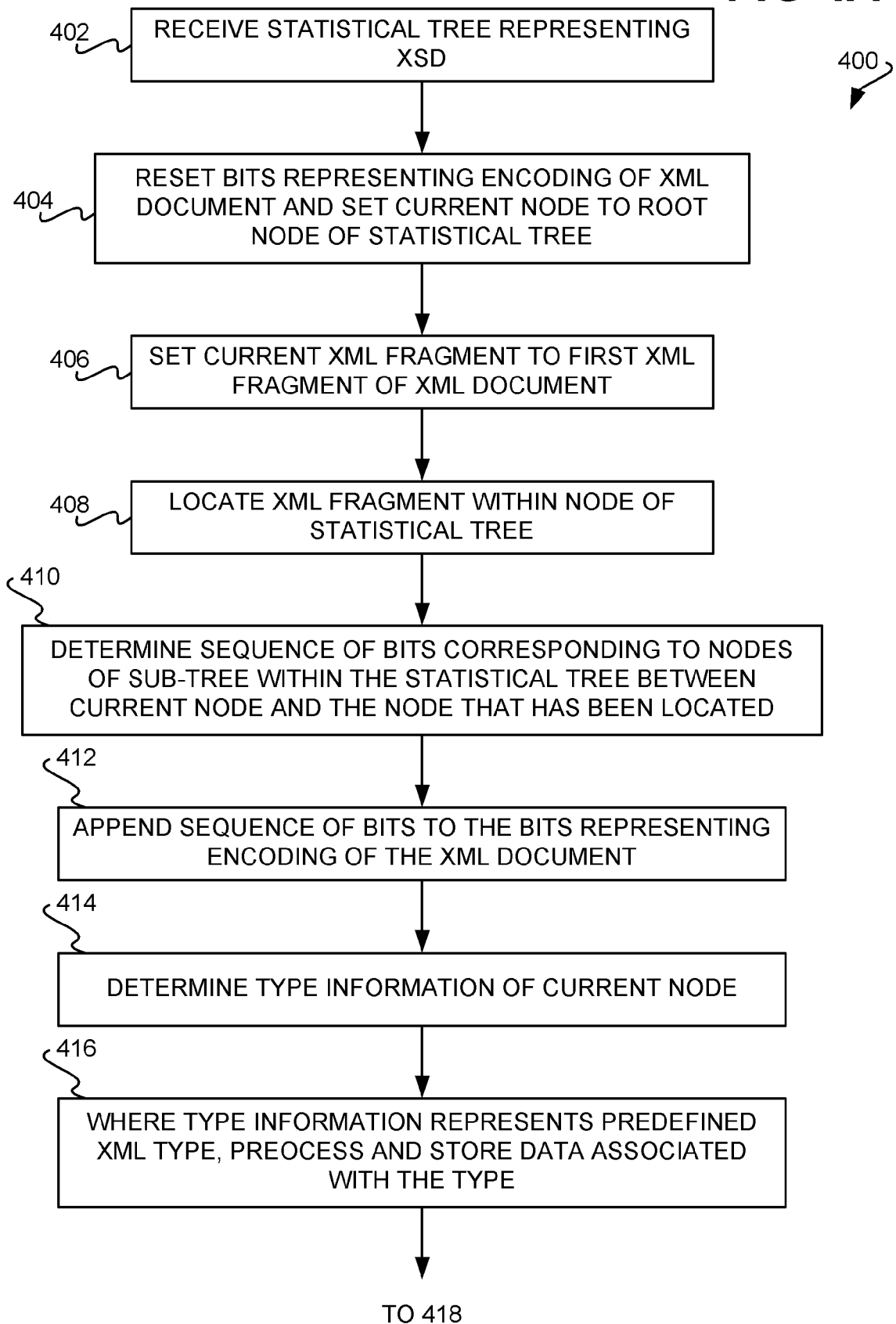

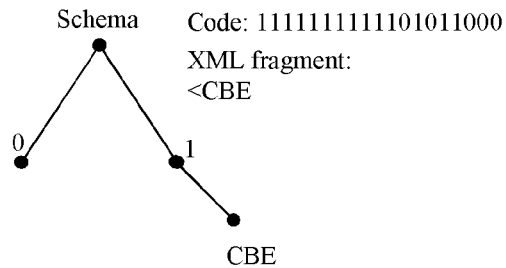
FIG 5A
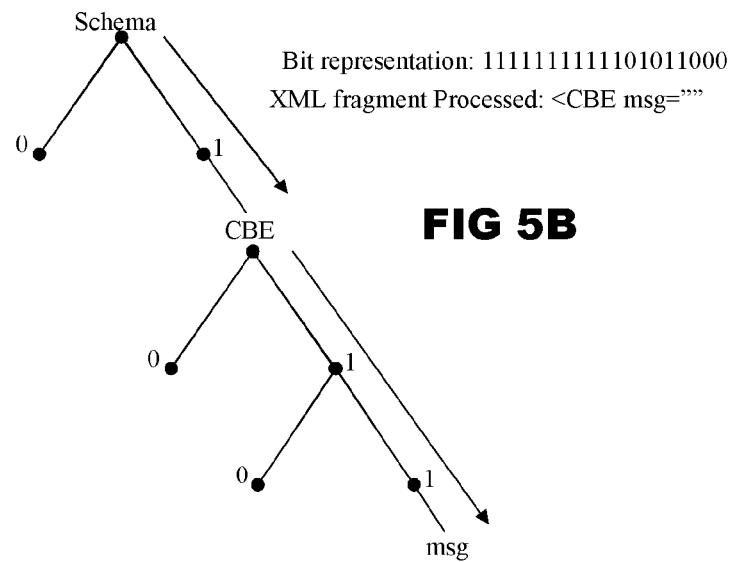
FIG 5B
msg:simpleType
(unique id)
↓
data
FIG 5C
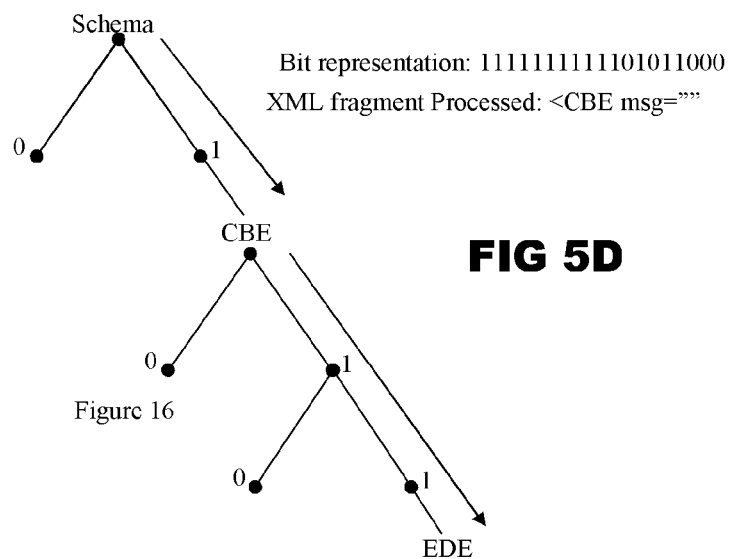
FIG 5D

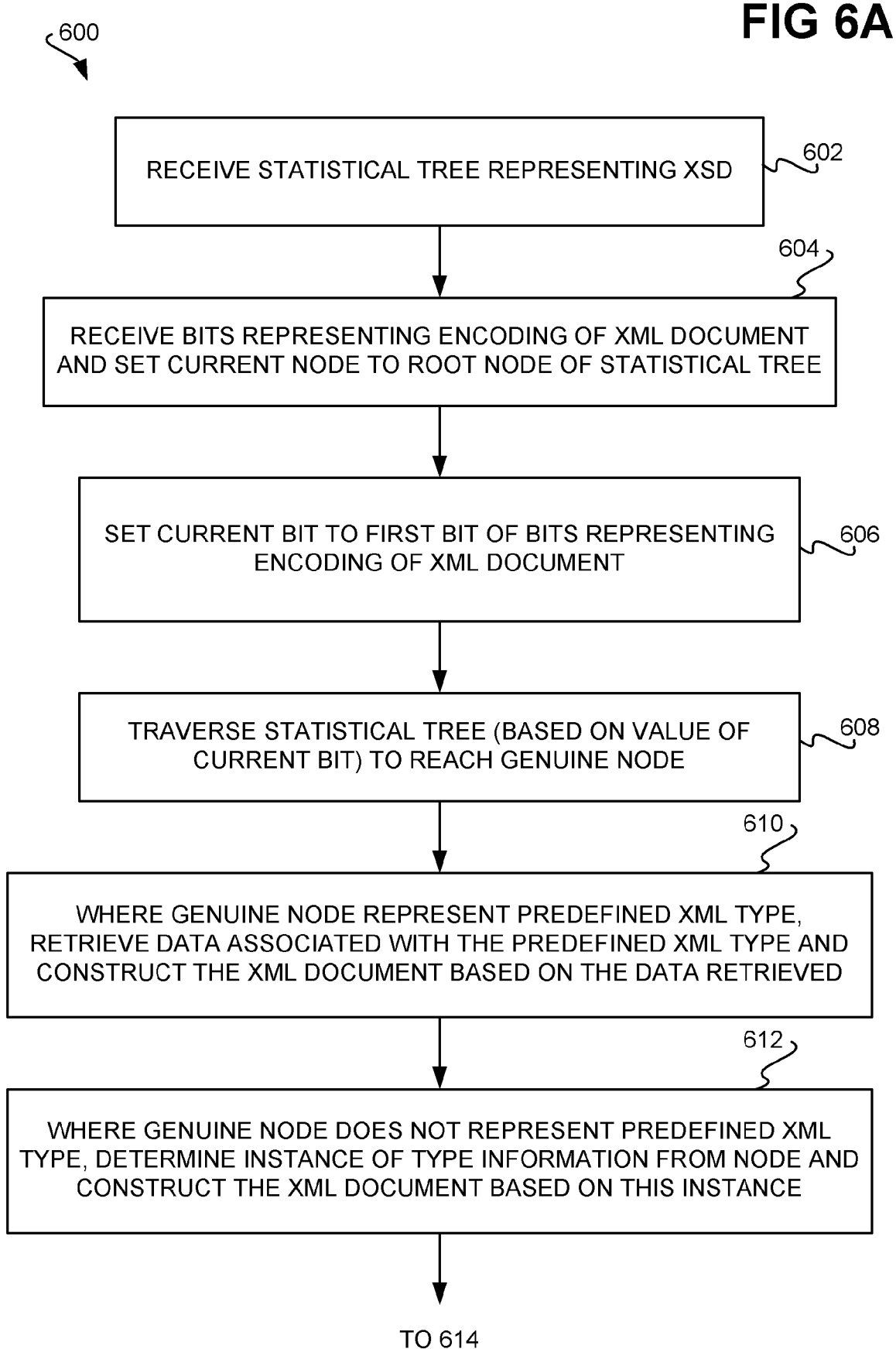

ENCODING AND DECODING OF XML DOCUMENT USING STATISTICAL TREE REPRESENTING XSD DEFINING XML DOCUMENT

RELATED APPLICATIONS

This patent application is related to the previously filed patent application entitled "Generating a statistical tree for encoding/decoding an XML document," filed on Nov. 17, 2006, and assigned Ser. No. 11/561,043.

FIELD OF THE INVENTION

The present invention relates generally to eXtensible Markup Language (XML) documents defined by an XML Schema document (XSD), and more particularly to encoding and decoding of XML documents by using a statistical tree representing the XSD.

BACKGROUND OF THE INVENTION

Structural information may be defined by a document written in a markup language, such as the eXtensible Markup Language (XML). XML specifies both the structure and content of a document, at the expense of significant redundancy. The simplicity and the ease of representing data in XML have resulted in an increasing move to utilize XML across different domains, ranging from databases to web applications. However, XML documents tend to be quite large compared to other forms of data representation, which reduces performance when using such documents. For instance, increased bandwidth is required to communicate XML documents, and increased storage capacity is required to store XML documents. Therefore, it is desirable that an efficient XML document encoding technique be developed to minimize data storage and transmission requirements and to improve processing performance.

SUMMARY OF THE INVENTION

The present invention relates to encoding and decoding an eXtensible Markup Language (XML) document defined by an XML Schema document (XSD) by using a statistical tree representing the XSD. A method of an embodiment of the invention for encoding an XML document defined by an XSD includes at least the following. A statistical tree representing the XSD is received. The statistical tree captures information defined by the XSD by representing elements, attributes, and enumerations of the XSD as branches, nodes, and leaves of the statistical tree. The statistical tree has bits corresponding to nodes of the statistical tree. Bits representing an encoding of the XML document are reset, and a current node is set to a root node of the statistical tree.

For each XML fragment of a number of XML fragments of the XML document, the following is performed by the method, in the order in which the XML fragments appear within the XML document. As a defined entry point entry point of the method, the XML fragment is located within a node of the statistical tree. A sequence of bits corresponding to nodes of a sub-tree within the statistical tree between the current node and the node of the statistical tree that has been located is determined. The sequence of the bits is appended to the bits representing the encoding of the XML document. The method then sets the node of the statistical tree that has been located as the current node. Once all the XML fragments have been processed, the bits representing the encoding of the XML document are output.

A method of an embodiment of the invention for decoding an XML document defined by an XSD includes at least the following. A statistical tree representing the XSD is received. The statistical tree captures information defined by the XSD by representing elements, attributes, and enumerations of the XSD as branches, nodes, and leaves of the statistical tree. The statistical tree has bits corresponding to nodes of the statistical tree. Bits representing an encoding of the XML document are also received, and a current node is set to a root node of the statistical tree.

For each bit of the bits representing an encoding of the XML document, the following is performed. The statistical tree is traversed from the current node based on a value of the bit to reach a genuine node of the statistical tree. The genuine node represents an element, attribute, or enumeration within the statistical tree. Where the genuine node of the statistical tree represents a predefined XML type, data associated with the predefined XML type is retrieved, the XML document is constructed, based on the data retrieved, and a defined entry point of the method is proceeded to. As the defined entry point, the method optimizes a sub-tree where a root node of the sub-tree is set as an immediate parent node of the genuine node. The method then sets the current node as the genuine node. Once all the bits have been processed, the XML document as has been constructed is output.

A system of an embodiment of the invention includes a statistical tree generation component to generate a statistical tree representing an XSD. The statistical tree captures information defined by the XSD by representing elements, attributes, and enumerations of the XSD as branches, nodes, and leaves of the statistical tree. The statistical tree has bits corresponding to nodes of the statistical tree. The system includes a compression component to adaptively encode an XML document defined by the XSD. The XML document is encoded at least as a number of bits based on the statistical tree generated by the statistical tree generation component. The system also includes a decompression component to adaptively decode the XML document from the number of bits based on the statistical tree generated by the statistical tree generation component.

Still other aspects and embodiments of the invention, as well as advantages thereof, will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram of an exemplary eXtensible Markup Language (XML) Schema document (XSD), according to an embodiment of the invention.

FIG. 2 is a diagram of an exemplary XML document, according to an embodiment of the invention.

FIGS. 3A, 3B, 3C, and 3D are diagrams showing traversal of a statistical tree representing the XSD of FIG. 1 to adaptively encode the XML document of FIG. 2, according to an embodiment of the invention.

FIGS. 4A and 4B are flowcharts of a method for adaptively encoding an XML document, according to an embodiment of the invention.

FIGS. 5A, 5B, 5C, and 5D are diagrams showing traversal of a statistical tree representing the XSD of FIG. 1 to adaptively decode the XML document of FIG. 2 after the XML document has been encoded, according to an embodiment of the invention.

FIGS. 6A and 6B are flowcharts of a method for adaptively decoding an XML document, according to an embodiment of the invention.

DETAILED DESCRIPTION OF THE DRAWINGS

Figure 3C:
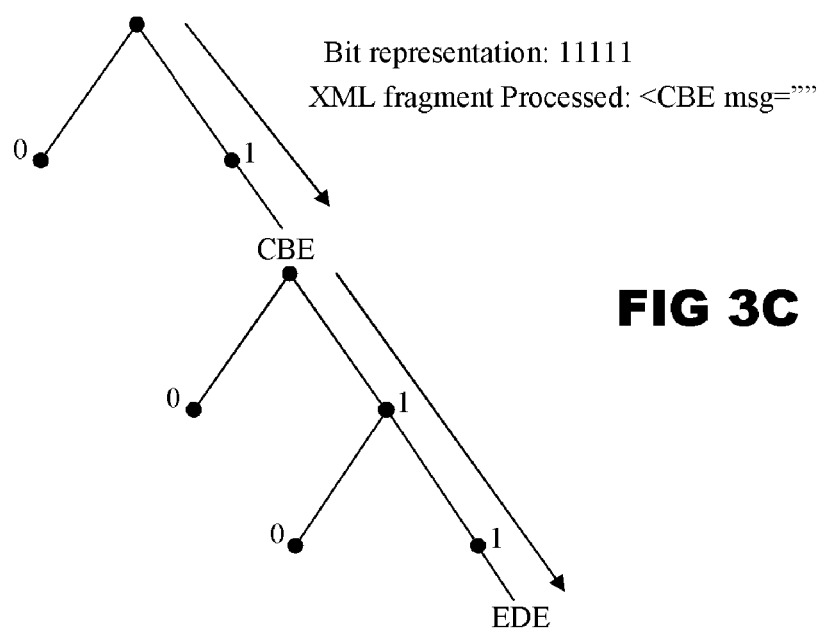

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Statistical Tree Representing XSD

FIG. 1 shows an eXtensible Markup Language (XML) Schema document (XSD), according to an embodiment of the invention. An XSD is an XML schema that is written in XML syntax. As such, the XSD is used to define an XML document, as can be appreciated by those of ordinary skill within the art.

A statistical tree can be generated from an XSD, which may then be used in the encoded and decoding of any XML document which has structural content complying with the XSD. An XSD expresses shared vocabularies and defines the structure, content and semantics of an XML document which utilizes that particular XSD. A statistical tree captures the information defined by the XSD by representing the elements, attributes and enumerations as branches, nodes and leaves of a statistical tree. The elements, attributes and enumerations of an XSD or corresponding XML document may be referred to as the components of the XSD. Traversing the paths between nodes of a statistical tree can be represented by binary sequences, which therefore can be interpreted to describe the structure of the XSD.

In one embodiment of the invention, a statistical tree is generated by using the approach described in the previously filed patent application entitled "Generating a statistical tree for encoding/decoding an XML document," filed on Nov. 17, 2006, and assigned Ser. No. 11/561,043, which has been incorporated in its entirety by reference. In particular, the present patent application is a continuation-in-part (CIP) of this patent application.

The statistical tree is described in this referenced patent application as being generated by virtue of following a number of rules governing construction of the tree. In one embodiment, these rules are as follows, which have been determined to provide for substantially optimal encoding and decoding of XML documents using the statistical tree:

(1) At any level, all tags, attributes, and enumerations are prioritized based on the number of times they can occur, such that the lesser the number of possible occurrences, the higher priority a given tag, attribute, or enumeration has;

(2) Attributes have higher priority over elements and enumerations;

(3) If there are multiple tags or attributes satisfying the above conditions, then tags and attributes having a higher minimum occurrence are given higher priorities; and, (4) If there are multiple tags or attributes satisfying the above conditions at a given time, then priority is assigned based on the increasing order of the lengths and characters of such tags and attributes; that is, the tags and attributes will be ordered and priorities accordingly assigned.

Adaptively Encoding an XML Document Using a Statistical Tree

In this section of the detailed description, how an eXtensible Markup Language (XML) document can be compressed, or encoded, in an adaptive manner by using a statistical tree representing the XML Schema document (XSD) that defines the XML document is described. In particular, such an encoding approach is described in reference to an example XML document defined using the XSD of FIG. 1. Thereafter, a more generalized method is presented for this encoding approach as has been described by example.

The process of encoding involves traversing the statistical tree and the XML document representing each of the attributes, elements, and enumerated data in the XML document, with their paths in bits with respect to their parents, and performing a set of optimizations on the tree based on the current occurrences and possible number of occurrences using rules governing the construction of the statistical tree. Examples of such rules have been presented in the previous section of the detailed description. FIG. 2 shows a sample XML document defined by the XSD of FIG. 1, according to an embodiment of the invention. The process of encoding is exemplarily described in relation to the XML document of FIG. 2.

The XML document of FIG. 2 starts with the "CBE" element, which is reached by taking the path through node 1 from the root node "Schema" with a sub-tree of the statistical tree representing the XSD of FIG. 1. FIG. 3A shows this particular sub-tree of a statistical tree representing the XSD of FIG. 1, according to an embodiment of the invention. Furthermore, by examining the type information for CBE, it is known that CBE is of the type CBEType. As a result, a copy of the type tree is merged with this node, and traversal continues from this node.

Furthermore, there is an additional process that optimizes the statistical tree based on the number of occurrences of the nodes, attributes, and/or enumerations that have just been processed. This optimization reduces the number of bits required to represent the still valid data in XML. The optimization updates the tree being used as follows. First, any nodes that cannot have any more occurrences are removed from the tree. Second, the rules governing the construction of the statistical tree, such as those described in the previous section of the detailed description, are reapplied to the tree.

The next XML fragment within the XML document of FIG. 1 is the "msg" attribute of the CBEType element, which can be reached by following the path within the statistical tree with the nodes labeled 1 and 1, from the CBE/CBEType genuine node. A genuine node is a node within the statistical tree that represents an element, an attribute, or an enumeration within the statistical tree. The nodes traversed are added as individual bits to the encoding of the XML document.

FIG. 3B shows the traversal of the statistical tree as described in previous paragraph, according to an embodiment of the invention. The traversal resets to the immediate parent genuine node of a particular genuine node when a leaf node is reached while traversing its child nodes. For example, in FIG. 3B, the "msg" node is traversed and when it is found that "#d" is a leaf, the traversal resets to the "CBE" node, from where the traversal starts anew when the next XML fragment is processed. It is noted that "#d" is the representation that is used in a statistical tree to denote that textual data is expected.

The optimization on the statistical tree is then performed. In this optimization, it is determined that the msg attribute has already been used to its maximum allowed occurrence, and will not occur again. Therefore, it can be removed from the statistical tree, and the statistical tree can be restructure by moving the node labeled 0 to the position of node 1, which is the parent node of msg node's parent node. That is, it is the parent of the msg node's parent that is being acted upon. The msg node's immediate parent is 1, and its parent is 1; therefore, this node's child node 0 is moved to the position, making it node 1, and thus in effect collapsing the node.

FIG. 3C shows the statistical tree is traversed in relation to the next XML fragment EDE, according to an embodiment of the invention. The XML fragment XDE is processed in a similar manner to the way the "msg" XML fragment was processed. The only difference is that this time the traversal does not reset to the parent "CBE" genuine node, because the "EDE" genuine node has children. Likewise, in the same way all the children of the EDE sub-tree within the statistical tree can be processed.

Figure 3D:
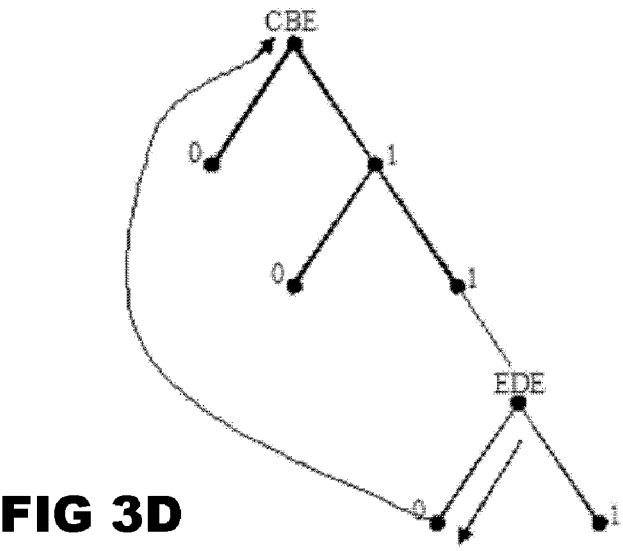

Once all the children of EDE have been processed, the traversal of the statistic tree restarts from the "CBE" genuine node so that the other children can be processed. FIG. 3D shows how this subsequent traversal is achieved, according to an embodiment of the invention. In particular, the leaf "0" is traversed from the EDE genuine node when the end tag for "EDE" is processed. Since this is a leaf, the traversal starts from the parent genuine node of "EDE," which is the node "CBE".

After this stage, another set of optimizations to the statistical tree can be performed to remove any parents that may be a part of the parent of the EDE node from the tree. This is achievable because from the well defined XML syntax t is known that attributes are the element of an element and always are processed before the child elements that the element contains. As such, it is ensure that no XML content is waited for that may not actually appear in the XML document.

The same policy may be applied for content that has been declared to be serial in nature. For example, it may be declared that "a" may occur before "b" only. As such, if "b" is found prior to "a" than any references that expect "a" can be removed. This information is available from the statistical tree that has been generated.

The complete set of bits encoding the XML document of FIG. 2 are 111111111101011000, which represents about a 40% better structural compression than regular statistical encoding. The only uncompressed data is "sample," "demo1," "100," "101," and "compressor." Thus, just 18 bits are needed to represent the entire XML structure of the XML document of FIG. 2. This sequence of bits, as well as the uncompressed data, can then be input into a text compression engine to achieve even higher compression.

Figure 4B:
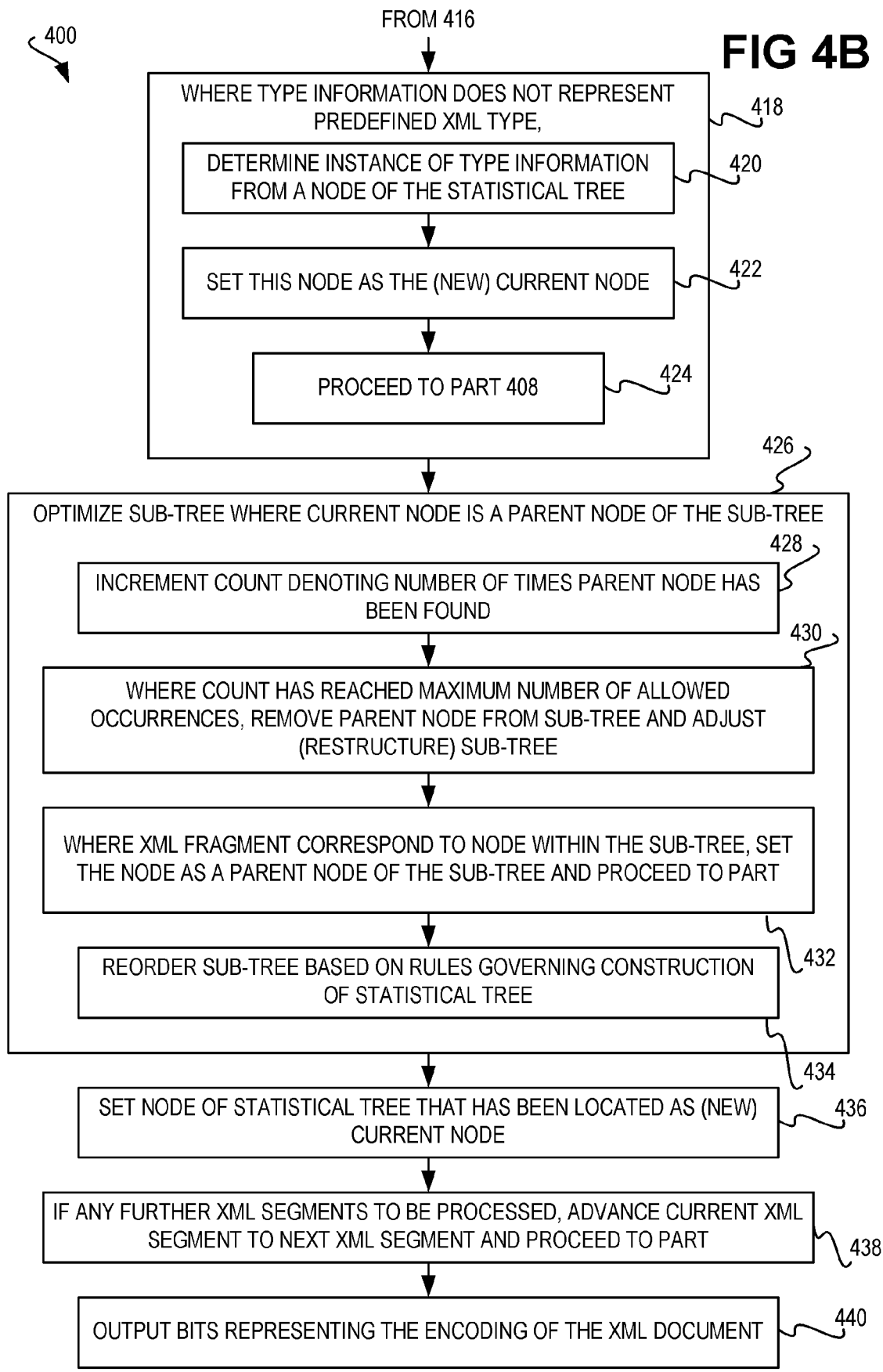

FIGS. 4A and 4B show a method 400 that generalizes the encoding of an XML document using a statistical tree representing the XSD used to define the XML document, according to an embodiment of the invention. A statistical tree representing the XSD is received (402). Receiving this statistical tree can include generating the statistical tree in one embodiment, where the statistical tree is generated using the approach described in the patent application that has been referred to above, in relation to which the present patent application is a continuation-in-part (CIP).

The bits representing the encoding or compressing of the XML document are initially reset to include no bits at first, and what is referred to as a current node is set to the root node of the statistical tree (404). What is referred to as a current XML fragment of the XML document is also initially set to the first XML fragment of the XML document (406). An XML fragment is generally defined herein as an instance of an element, attribute, or enumerated data of the XML document.

Thereafter, the current XML fragment is located within a node of the statistical tree (408). The sequence of bits corresponding to the path of nodes of the sub-tree within the statistical tree between the current node and the node that has been located (i.e., the node containing the current XML fragment) is determined (410). For instance, each node within the statistical sub-tree branches to two other nodes in one embodiment. One of these paths is labeled as a one bit, and the other path is labeled as a zero bit. Thus, the sequence of bits is the sequence of one and zero bits along the path the current node to the node that contains the current XML fragment. This sequence of bits is appended to the bits representing the encoding of the XML document (412). Where the bits representing the encoding of the XML document initially includes no bits, therefore, these bits are set equal to the sequence of bits determined in part 410.

The type information of the current node is determined (414). The type information can indicated that the current node represents a predefined XML type, or does not represent a predefined XML type, where in the latter case an instance of the type information is specifically enumerated within the XSD. Where the type information does indeed represent a predefined XML type, the data associated with this predefined XML type is processed and stored (416). Processing can include any operation, such as simple textual compression, or even translation, as can be appreciated by those of ordinary skill within the art.

By comparison, where the type information does not represent a predefined XML type, then an enumerated instance of the type information is determined or retrieved from one of the nodes of the statistical tree that pertains to this type information (420). This node that contains the type information in question is set as the (new) current node (422). The method 400 then proceeds back to part 408 (424).

A sub-tree of the statistical tree with the parent node of the current node as the root node is then optimized (426). A count, or counter, is incremented (426), where the count denotes the number of times the current node has thus far been located in the statistical tree (428). If the count has reached a maximum number of allowed occurrences, then the current node is removed from the sub-tree, and the sub-tree is adjusted (i.e., restructured) (430). That is to say, the statistical tree is adjusted so that it no longer includes the current node. The maximum number of allowed occurrences of the current node may be specified within the XSD itself, for instance, as can be appreciated by those of ordinary skill within the art.

If the current XML fragment corresponds to a node within the sub-tree (i.e., a node within the sub-tree contains the current XML fragment), then this node is set as the parent node of a (new) sub-tree, and the method is repeated at part 428 (432). Otherwise, the sub-tree is reordered based on the rules governing the construction of the statistical tree (434). For instance, these may be the rules that have been described above.

Ultimately, the node of the statistical tree that has been located in part 408 is set as the (new) current node (436). If there are any further XML segments within the XML document that still have to be processed, the current XML fragment is advanced to the next XML segment within the XML document, and the method proceeds back to part 408 (438). Once all the XML fragments have been processed, then the bits representing the encoding of the XML document are output (440). For instance, these bits may be displayed to a user on a display device, they may be stored on a storage device like a hard disk drive or a memory, the bits may be transmitted over a network, and so on.

The XML document is specifically "adaptively" encoded in the method 400 by virtue of the statistical tree being adjusted during performance of the method 400. For instance, in parts 430 and 434, a sub-tree of the statistical tree is adjusted and reordered, respectively. Such adjustment and reordering optimizes the statistical tree for the purposes of compression (i.e., encoding) of the XML document being processed. Without this adjustment and/or without this reordering, the encoding of the XML document is not as compact.

Adaptively Decoding an XML Document Using a Statistical Tree

In this section of the detailed description, how an eXtensible Markup Language (XML) document can be decompressed, or decoded, in an adaptive manner by using a statistical tree representing the XML Schema document (XSD) that defines the XML document is described. In particular, such a decoding approach is described in reference to an example XML document defined using the XSD of FIG. 1. This XML document is particularly that of FIG. 2 that has been described, as encoded as the sequence of bits 1111111111110101000, as has been described in the previous section of the detailed description. Thereafter, a more generalized method is presented for this decoding approach as has been described by example.

The process of decoding involves traversing the statistical tree based on the bit pattern present in the encoded sequence of bits. The XML document is created by representing each of the attributes, elements, and enumerated dated within the XML document. Whenever a node is reached, its type is examined and the respective type is merged with the node prior to generating the corresponding XML fragment of the document. Thus, the decoding process can be considered to at least some extent to be the reverse process of the encoding process that has been described in the previous section of the detailed description, as can be appreciated by those of ordinary skill within the art.

FIGS. 5A, 5B, 5C, and 5D illustratively depict partial decoding of the XML document of FIG. 2 from the encoded bits 1111111111110101000, according to an embodiment of the invention. IN FIG. 5A, decoding of the first bit "1" is shown, resulting in the XML fragment <CBE. In FIG. 5B, decoding of the next two bits "11" is shown, resulting in the XML fragment in question being expanded to <CBE msg="".

However, when the traversal reaches this msg node, as illustratively depicted in FIG. SC, it is found that this node is of the type msgSimpleType, which is has to be merged and for which its data has to be retrieved from storage. Since each node carries information on what of node it is—i.e., an attribute, tag, or enumerated data—the XML document is thus easily constructed. Each time a leaf node is reached, traversal resets to the parent genuine node of the leaf node's parent genuine node. The same set of optimizations that were performed during encoding are applied during the decoding process as well, which generates the same adjusted and reordered statistical tree as during the encoding process.

For example, FIG. 5D shows the decoding process after the first five bits "11111" have been processed. In particular, FIG. 5DC shows the statistical tree after the optimization was performed on the sub-tree in question. It is noted, therefore, that the end result depicted in FIG. 5D as to the decoding process is the same as that depicted in FIG. 3C as to the encoding process. The decoding process is repeated recursively in this manner, until the entire XML document has been recreated on an XML fragment-by-XML fragment basis, as can be appreciated by those of ordinary skill within the art.

Figure 6B:
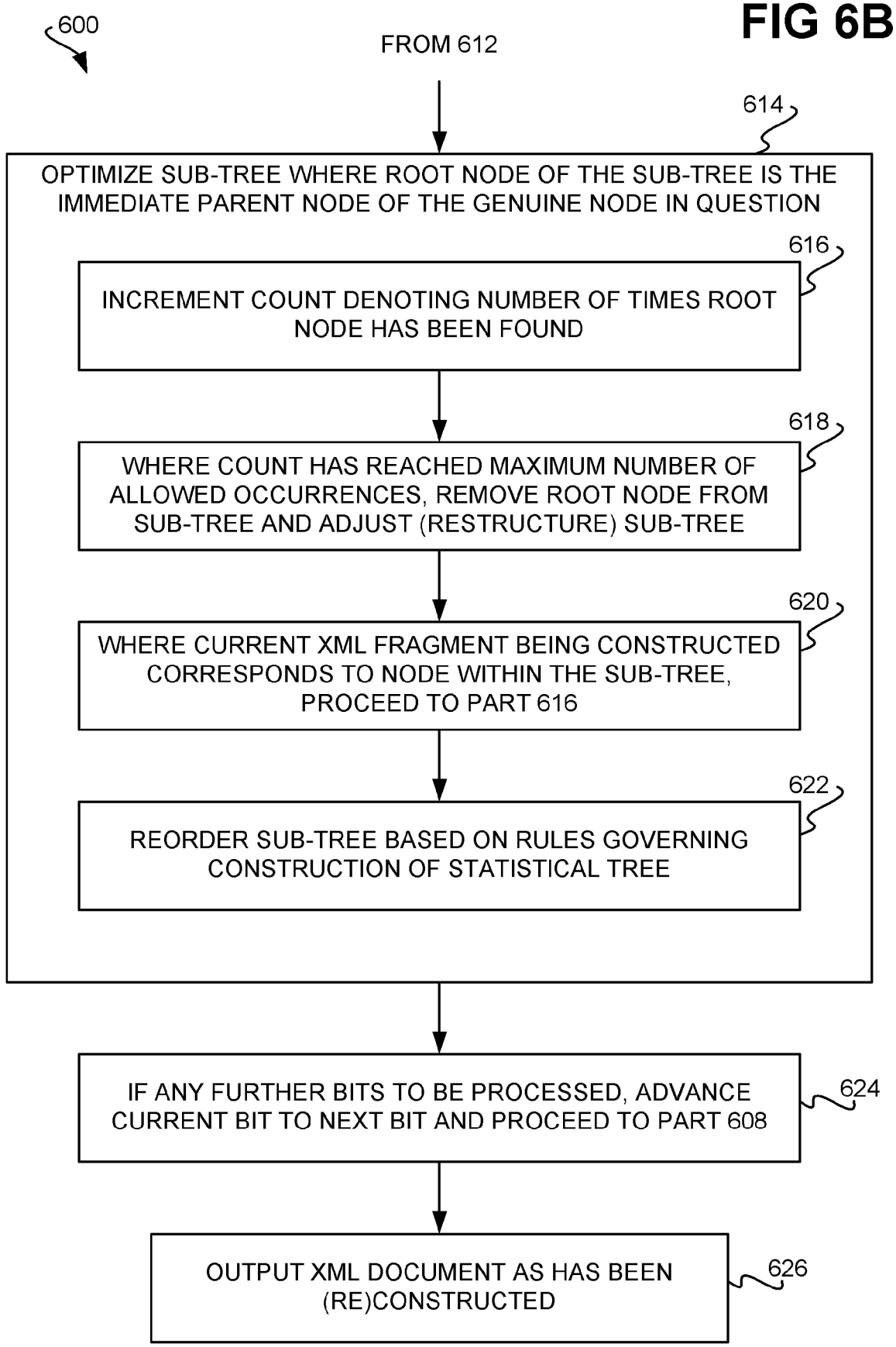

FIGS. 6A and 6B show a method 600 that generalizes the decoding of an XML document using a statistical tree representing the XSD used to define the XML document, according to an embodiment of the invention. A statistical tree representing the XSD is received (602). Receiving this statistical tree can include generating the statistical tree in one embodiment, where the statistical tree is generated using the approach described in the patent application that has been referred to above, in relation to which the present patent application is a continuation-in-part (CIP).

The bits representing the encoding or compressing of the XML document are also received, and what is referred to as a current node is set to the root node of the statistical tree (604). What is referred to as a current bit of the bits representing encoding of the XML document is set to the first bit (606). Thus, the method 600 proceeds through the bits of the encoding on a bit-by-bit basis to reconstruct the XML document on an XML fragment-by-XML fragment basis.

Thereafter, the statistical tree is traversed, based on the value of the current bit, to reach a genuine node of the statistical tree (608). Traversing the statistical tree based on the value of the current bit means that if the bit has a one value, then the one-value path from the current node is followed, and if the bit has a zero value, then the zero-value path from the current node is followed, to reach a genuine node. That is, each node within the statistical sub-tree branches to two other nodes in one embodiment. One of these paths is labeled as a one bit, and the other path is labeled as a zero bit.

Where the genuine node represents a predefined XML type, then the data previously processed and stored that is associated with this predefined XML type is retrieved, and the XML document is constructed based on this data (610). That is, an XML fragment of the XML document is constructed based on this retrieved data. Part 610 can be said to correspond to part 416 of the method 400.

By comparison, where the genuine node does not represent a predefined XML type—and instead corresponds to other type information—then the statistical tree is traversed to location a node corresponding to an instance of this type information, and the XML is constructed based on this instance (612). That is, an XML fragment of the XML document is constructed based on this enumerated instance of the type information located in this node. Part 612 can be said to correspond to part 420 of the method 400.

Thereafter, a sub-tree of the statistical tree is optimized, where the root node of the sub-tree is the immediate parent node of the genuine node in question (i.e., that which has been traversed to in part 608) (614). A count, or counter, is incremented (614), where the count denotes the number of times the root node has thus far been located in the statistical tree (616). If the count has reached a maximum number of allowed occurrences, then the root node is removed from the sub-tree, and the sub-tree is adjusted (i.e., restructured) (618). The maximum number of allowed occurrences of the current node may be specified within the XSD itself, for instance, as can be appreciated by those of ordinary skill within the art.

If the current XML fragment that has been reconstructed in part 610 or part 612 corresponds to a node within the sub-tree (i.e., a node within the sub-tree contains the this XML fragment), then this node is set as the parent node of a (new) sub-tree, and the method is repeated at part 616 (620). Otherwise, the sub-tree is reordered based on the rules governing the construction of the statistical tree (622). For instance, these may be the rules that have been described above.

If there are any further bits within the bits representing encoding of the XML document that still have to be processed, the current bit is advanced to the next bit within the bits representing encoding of the XML document, and the method proceeds back to part 608 (624). Once all the bits have been processed, then the XML document as has been reconstructed is output (626). For instance, the XML document may be displayed to a user on a display device, it may be stored on a storage device like a hard disk drive or a memory, it may be processed or otherwise employed in a data-processing operation, and so on.

The XML document is specifically "adaptively" decoded in the method 600 by virtue of the statistical tree being adjusted during performance of the method 600. For instance, in parts 618 and 622, a sub-tree of the statistical tree is adjusted and reordered, respectively. In this way, therefore, adaptive decoding of the XML document is analogous to adaptive encoding of the XML document as has been described in the previous section of the detailed description.

REPRESENTATIVE SYSTEM AND CONCLUSION

Figure 7:
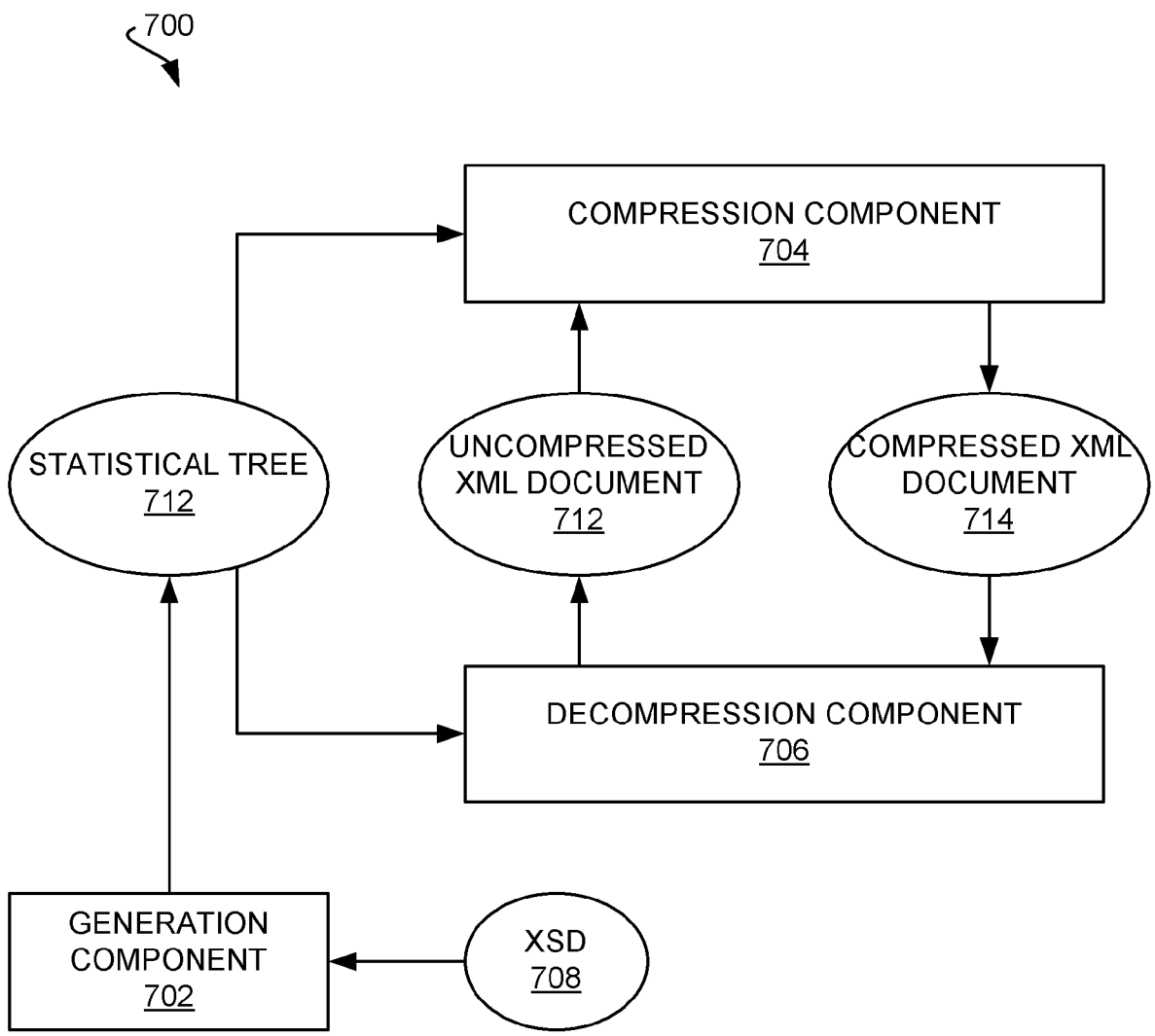
FIG. 7 is a diagram of a representative system, according to an embodiment of the invention.

FIG. 7 shows a representative system 700, according to an embodiment of the invention. The system 700 includes a generation component 702, a compression component 704, and a decompression component 706. The components 702, 704, and 706 may be implemented in software, hardware, or a combination of software and hardware. For instance, each of the components 702, 704, and 706 may include or be one or more computer programs executed by a processor from memory.

The generation component 702 generates a statistical tree 710 from an eXtensible Markup Language (XML) Schema document (XSD) 708. The XSD 708 defines the uncompressed XML document 712. The statistical tree is generated using the approach described in the patent application that has been referred to above, in relation to which the present patent application is a continuation-in-part (CIP).

The compression component 704 compresses the XML document 712 by using the statistical tree 710, to yield the compressed XML document 714. The compression component 704, for instance, performs the method 400 of FIGS. 4A and 4B that has been described. By comparison, the decompression component 706 decompressed the compressed XML document 714 by using the statistical tree 710, to yield the uncompressed XML document 712. The decompression component 706, for instance, performs the method 600 of FIGS. 6A and 6B that has been described.

It is noted that, although specific embodiments have been illustrated and described herein, it will be appreciated by those of ordinary skill in the art that anyF arrangement calculated to achieve the same purpose may be substituted for the specific embodiments shown. This application is thus intended to cover any adaptations or variations of embodiments of the present invention. Therefore, it is manifestly intended Fthat this invention be limited only by the claims and equivalents thereof.

We claim:

1. A computer implemented method for encoding an eXtensible Markup Language (XML) document defined by an XML Schema document (XSD), the method executed by a processor comprising:

receiving a statistical tree representing the XSD, the statistical tree capturing information defined by the XSD by representing elements, attributes, and enumerations of the XSD as branches, nodes, and leaves of the statistical tree, the statistical tree having a plurality of bits corresponding to nodes of the statistical tree;

resetting a plurality of bits representing an encoding of the XML document and setting a current node to a root node of the statistical tree;

for each XML fragment of a plurality of XML fragments of the XML document, in an order in which the XML fragments appear within the XML document, as a defined entry point, locating the XML fragment within a node of the statistical tree;

determining a sequence of bits corresponding to nodes of a sub-tree within the statistical tree between the current node and the node of the statistical tree that has been located;

appending the sequence of the bits to the bits representing the encoding of the XML document;

setting the node of the statistical tree that has been located as the current node; and, outputting the bits representing the encoding of the XML document;

wherein, for each XML fragment of the plurality of XML fragments of the XML document, in the order in which the XML fragments appear within the XML document, the method further comprises, after appending the sequence of the bits to the bits representing the encoding of the XML document:

determining type information of the current node from the statistical tree;

where the type information represents a predefined XML type, storing data associated with the predefined XML type;

wherein, for each XML fragment of the plurality of XML fragments of the XML document, in the order in which the XML fragments appear within 10 the XML document, the method further comprises, after appending the sequence of the bits to the bits representing the encoding of the XML document:

where the type information does not represent a predefined XML type, determining an instance of the type information from a node of the statistical tree;

setting the node of the statistical tree from which the instance of the type information has been determined as the current node; and, reentering the method at the defined entry point; wherein, for each XML fragment of the plurality of XML fragments of the XML document, in the order in which the XML fragments appear within the XML document, the method further comprises, after appending the sequence of the bits to the bits representing the encoding of the XML document:

optimizing the sub-tree based on the current node being a parent node of the sub-tree; wherein optimizing the sub-tree based on the current node being the parent node of the sub-tree comprises: as a second defined entry point, incrementing a count denoting a number of times the parent node has been found; where the count has reached its maximum number of allowed occurrences, removing the parent node from the sub-tree and adjusting the sub-tree due to removal of the parent node from the sub-tree.

2. The method of claim 1, wherein optimizing the sub-tree based on the current node being the parent node of the sub-tree further comprises:
- where the XML fragment corresponds to a node within the sub-tree, setting the node as a parent node of the sub-tree;
- reentering the method at the second defined entry point; and,
- reordering the sub-tree based on one or more rules governing construction of the statistical tree.

3. The method of claim 2, wherein the rules governing construction of the statistical tree comprise:
- a) prioritizing tags, attributes, and enumerations based on a number of times the tags, the attributes, and the enumerations occur, such that the tags, the attributes, and the enumerations having a lesser number of occurrences have higher priority;
- b) prioritizing the attributes over elements and the enumerations;
- c) where multiple tags or attributes satisfy a) and b), then the prioritizing the tags and the attributes with more occurrences as having higher priority; and,
- d) where multiple tags or attributes satisfy a), b), and c) at a given time, then prioritizing the tags and the attributes based on an increasing order of lengths of the tags and the attributes.

4. A computer implemented method for decoding an eXtensible Markup Language (XML) document defined by an XML Schema document (XSD), the method executed by a processor comprising:
- receiving a statistical tree representing the XSD, the statistical tree capturing information defined by the XSD by representing elements, attributes, and enumerations of the XSD as branches, nodes, and leaves of the statistical tree, the statistical tree having a plurality of bits corresponding to nodes of the statistical tree; receiving a plurality of bits representing an encoding of the XML document; setting a current node to a root node of the statistical tree;
- for each bit of the plurality of bits representing an encoding of the XML document, traversing the statistical tree from the current node based on a value of the bit to reach a genuine node of the statistical tree, the genuine node representing element, attribute, or enumeration within the statistical tree;
- where the genuine node of the statistical tree represents a predefined XML type, retrieving data associated with the predefined XML type; constructing the XML document based on the data retrieved; proceeding to a defined entry point of the method; as the defined entry point, optimizing a sub-tree where a root node of the sub-tree is set as an immediate parent node of the genuine node; setting the current node as the genuine node; and,
- outputting the XML document as has been constructed;
- wherein optimizing the sub-tree where the root node of the sub-tree is set as the immediate parent node of the genuine node comprises: as a second defined entry point, incrementing a count denoting a number of times the root node has been found; where the count has reached its maximum number of allowed occurrences, removing the root node from the sub-tree and adjusting the sub-tree due to removal of the root node from the sub-tree.

5. The method of claim 4, wherein, for each bit of the plurality of bits representing the encoding of the XML document, the method further comprises:
- where the genuine node of the statistical tree does not represent a predefined XML type, determining an instance of the type information from a node of the statistical tree; and, constructing the XML document based on the instance of the type information that has been determined.

6. The method of claim 4, wherein optimizing the sub-tree where the root node of the sub-tree is set as the immediate parent node of the genuine node further comprises: where a current XML fragment of the XML document being constructed corresponds to a node within the sub-tree, reentering the method at the second defined entry point.

7. The method of claim 6, wherein optimizing the sub-tree where the root node of the sub-tree is set as the immediate parent node of the genuine node further comprises: reordering the sub-tree based on one or more rules governing construction of the statistical tree.

8. The method of claim 7, wherein the rules governing construction of the statistical tree comprise:
- a) prioritizing tags, attributes, and enumerations based on a number of times the tags, the attributes, and the enumerations occur, such that the tags, the attributes, and the enumerations having a lesser number of occurrences have higher priority;
- b) prioritizing the attributes over elements and the enumerations;
- c) where multiple tags or attributes satisfy a) and b), then the prioritizing the tags and the attributes with more occurrences as having higher priority; and,
- d) where multiple tags or attributes satisfy a), b), and c) at a given time, then prioritizing the tags and the attributes based on an increasing order of lengths of the tags and the attributes.

9. A system comprising:
- a processor;
- a statistical tree generation component to generate a statistical tree representing an
- eXtensible Markup Language (XML) Schema document (XSD), the statistical tree capturing information defined by the XSD by representing elements, attributes, and
- enumerations of the XSD as branches, nodes, and leaves of the statistical tree, the statistical tree having a plurality of bits corresponding to nodes of the statistical tree;
- a compression component to adaptively encode an XML document defined by the XSD, the XML document encoded at least as a plurality of bits based on the statistical tree generated by the statistical tree generation component;
- and, a decompression component to adaptively decode the XML document from the plurality of bits based on the statistical tree generated by the statistical tree generation component; wherein the compression component is to adaptively encode the XML document by:
- resetting the plurality of bits representing an encoding of the XML document and setting a current node to a root node of the statistical tree;
- for each XML fragment of a plurality of XML fragments of the XML document, in an order in which the XML fragments appear within the XML document, as a defined entry point, locating the XML fragment within a node of the statistical tree;
- determining a sequence of bits corresponding to nodes of a sub-tree within the statistical tree between the current node and the node of the statistical tree that has been located;
- appending the sequence of the bits to the bits representing the encoding of the XML document;
- setting the node of the statistical tree that has been located as the current node; and, outputting the bits representing the encoding of the XML document; wherein, for each XML fragment of the plurality of XML fragments of the XML document, in the order in which the XML fragments appear within the XML document, wherein the compression component is to, after appending the sequence of the bits to the bits representing the encoding of the XML document:

determine type information of the current node from the statistical tree;

where the type information represents a predefined XML type, storing data associated with the predefined XML type;

where the type information does not represent a predefined XML type, determine an instance of the type information from a node of the statistical tree; set the node of the statistical tree from which the instance of the type information has been determined as the current node; and, reenter at the defined entry point; wherein, for each XML fragment of the plurality of XML fragments of the XML document, in the order in which the XML fragments appear within the XML document, the compression component is to, after appending the sequence of the bits to the bits representing the encoding of the XML document:

optimize the sub-tree based on the current node being a parent node of the sub-tree by:

as a second defined entry point, incrementing a count denoting a number of times the parent node has been found;

where the count has reached its maximum number of allowed occurrences, removing the parent node from the sub-tree and adjusting the sub-tree due to removal of the parent node from the sub-tree;

where the XML fragment corresponds to a node within the sub-tree, setting the node as a parent node of the sub-tree;

reentering at the second defined entry point; and, reordering the sub-tree based on one or more rules governing construction of the statistical tree.

10. The system of claim 9, wherein the rules governing construction of the statistical tree comprise:

a) prioritizing tags, attributes, and enumerations based on a number of times the tags, the attributes, and the enumerations occur, such that the tags, the attributes, and the enumerations having a lesser number of occurrences have higher priority;

b) prioritizing the attributes over elements and the enumerations;

c) where multiple tags or attributes satisfy a) and b), then the prioritizing the tags and the attributes with more occurrences as having higher priority; and, d) where multiple tags or attributes satisfy a), b), and c) at a given time, then prioritizing the tags and the attributes based on an increasing order of lengths of the tags and the attributes.

11. The system of claim 9, wherein the decompression component is to adaptively decode the XML document by:

setting a current node to a root node of the statistical tree;

for each bit of the plurality of bits representing an encoding of the XML document, traversing the statistical tree from the current node based on a value of the bit to reach a genuine node of the statistical tree, the genuine node representing element, attribute, or enumeration within the statistical tree;

where the genuine node of the statistical tree represents a predefined XML type, retrieving data associated with the predefined XML type;

constructing the XML document based on the data retrieved;

proceeding to a defined entry point; where the genuine node of the statistical tree does not represent a predefined XML type, determining an instance of the type information from a node of the statistical tree;

constructing the XML document based on the instance of the type information that has been determined;

as the defined entry point, optimizing a sub-tree where a root node of the sub-tree is set as an immediate parent node of the genuine node;

setting the current node as the genuine node; and, outputting the XML document as has been constructed.

12. The system of claim 9, wherein the decompression component is to optimize the sub-tree where the root node of the sub-tree is set as the immediate parent node of the genuine node by:

as a second defined entry point, incrementing a count denoting a number of times the root node has been found;

where the count has reached its maximum number of allowed occurrences, removing the root node from the sub-tree and adjusting the sub-tree due to removal of the root node from the sub-tree;

where a current XML fragment of the XML document being constructed corresponds to a node within the sub-tree, reentering at the second defined entry point; and, reordering the sub-tree based on one or more rules governing construction of the statistical tree.

* * * * *